United States Patent [19]
Fujita

[11] Patent Number: 5,581,160
[45] Date of Patent: Dec. 3, 1996

[54] METHOD AND APPARATUS FOR LIGHTING AN EL ELEMENT

[75] Inventor: Yuji Fujita, Shiga, Japan

[73] Assignee: NEC Corporation, Tokyo, Japan

[21] Appl. No.: 383,171

[22] Filed: Feb. 3, 1995

[30] Foreign Application Priority Data

Feb. 9, 1994 [JP] Japan ................................ 6-015023
May 26, 1994 [JP] Japan ................................ 6-112361
Oct. 27, 1994 [JP] Japan ................................ 6-263015

[51] Int. Cl.$^6$ ........................................................ G09G 3/10
[52] U.S. Cl. .................. 315/169.3; 315/160; 315/169.1; 315/174; 315/176
[58] Field of Search .................... 315/169.3, 169.1, 315/160, 174, 176, 226, 209 R, 240, 227

[56] References Cited

U.S. PATENT DOCUMENTS 5,172,032  12/1992  Alessio .................................. 315/169.3
5,313,141  5/1994  Kimball ............................... 315/169.3
5,349,269  9/1994  Kimball ............................... 315/169.3
5,502,357  3/1996  Kimball ............................... 315/169.3

FOREIGN PATENT DOCUMENTS 62-11314  3/1987  Japan .
62-15032  4/1987  Japan .

*Primary Examiner*—Frank Gonzalez
*Assistant Examiner*—Reginald A. Ratliff
*Attorney, Agent, or Firm*—Foley & Lardner

[57]                ABSTRACT

An electroluminescence (EL) element lighting device for an EL element, includes a first circuit for self-oscillating to generate a first signal having a first frequency, and for gradually charging up said EL element in response to the first signal, and a second circuit for self-oscillating to generate a second signal having a second frequency, and for discharging the charge stored in said EL element in response to the second signal. The first frequency of the first signal is greater than the second frequency of the second signal, and the second signal is active only during a time interval less than 50% of each period of the second signal.

15 Claims, 6 Drawing Sheets

Fig. 1
(PRIOR ART)
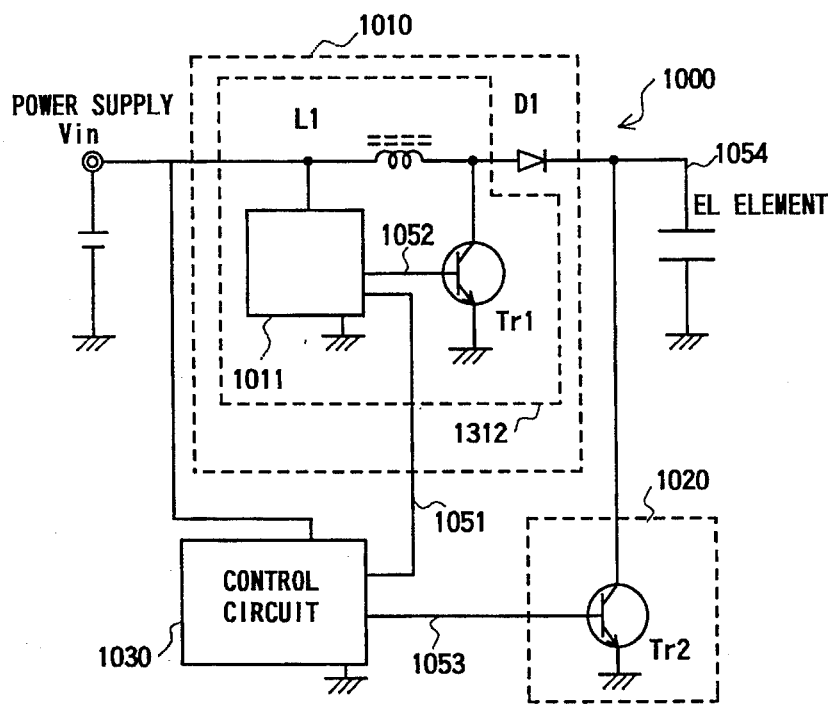
Fig. 2A SIGNAL 1051
(PRIOR ART)
Fig. 2B SIGNAL 1052
(PRIOR ART)
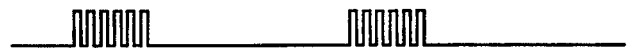
Fig. 2C SIGNAL 1053
(PRIOR ART)
Fig. 2D SIGNAL 1054
(PRIOR ART)
C: CHARGE
S: STOP
D: DISCHARGE Fig. 7
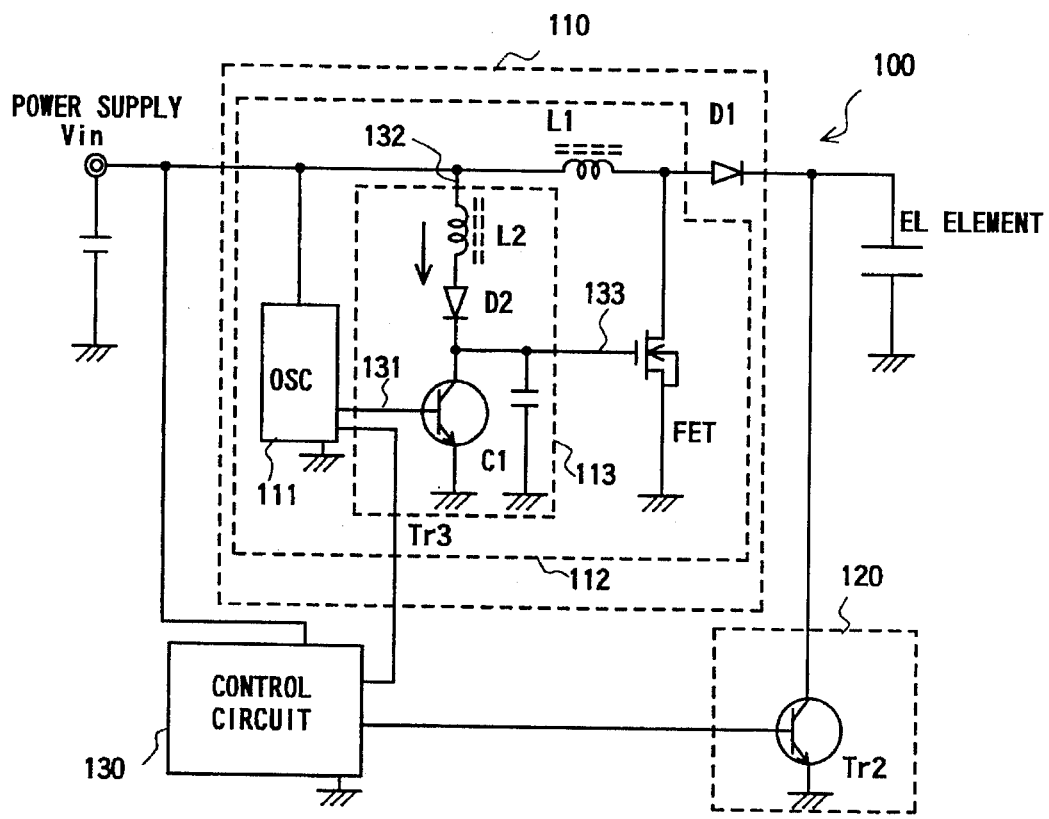
Fig. 8A SIGNAL 131
Fig. 8B SIGNAL 132
Fig. 8C SIGNAL 133

Fig. 10
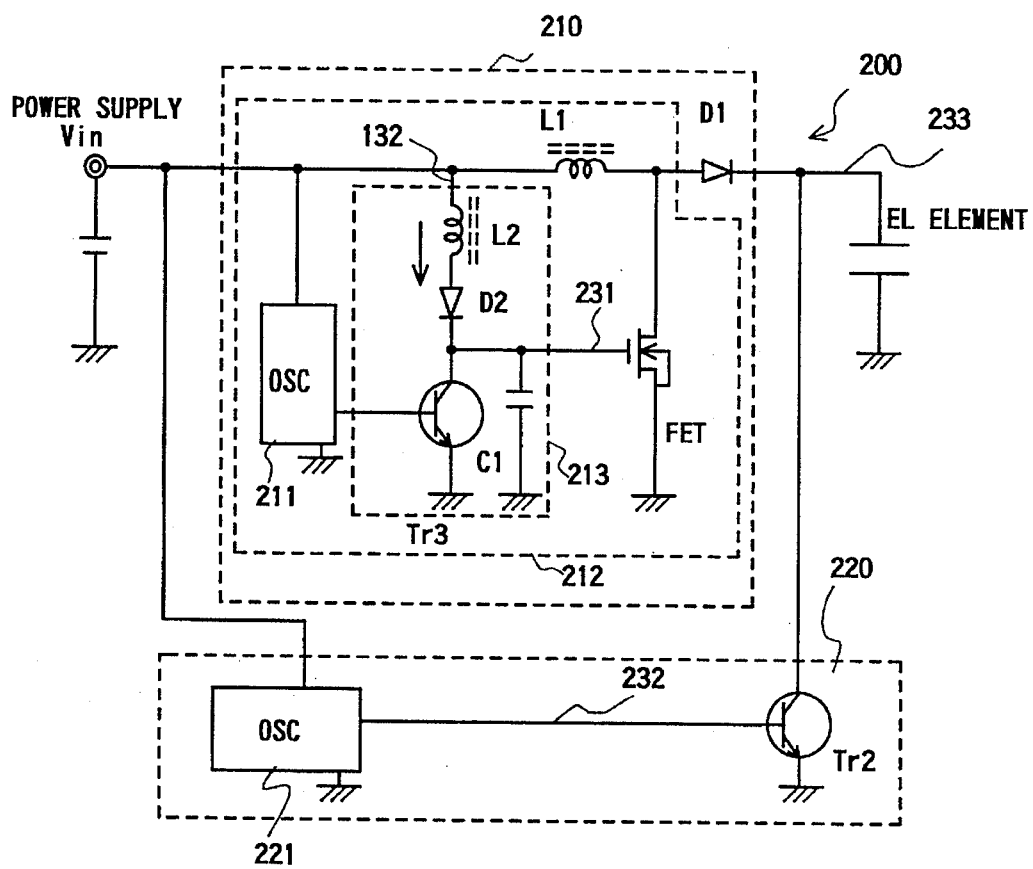
Fig. 11A SIGNAL 231 
Fig. 11B SIGNAL 232 
Fig. 11C SIGNAL 233 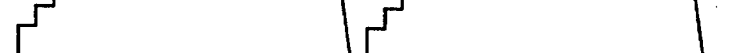

METHOD AND APPARATUS FOR LIGHTING AN EL ELEMENT

BACKGROUND OF THE INVENTION

1. Field of the Invention

The present invention relates to a method and apparatus for lighting an electro-luminescence (EL) element, and more particularly, to a method and apparatus for lighting an EL element, having a small size with high brightness.

2. Description of the Related Art

An (EL) element has the advantages in a thin type, a light weight, ad a flexible shape and has used for back-lighting a liquid crystal device. AC voltage of about 100 and about 800 Hz is required to light the EL device. In order to obtain such AC voltage, a DC-AC inverter is generally used for converting DC voltage into AC voltage. As such an inverter, a self-excited type of inverter has used which includes a blocking oscillating circuit composed of a transformer, transistors, resistors and capacitors, as proposed in Japanese Examined Patent Application Publication, JP-B-Sho-62-15032. In addition, there is proposed an inverter in Japanese Examined Patent Application Publication, JP-B-sho-62-11314, in which the EL element has an area as small as 10 $cm^2$ and is driven with a single dry cell.

In the self-excited type inverter including a blocking oscillating circuit, the circuit is simple but a ratio of the primary winding and the secondary winding of a transformer must become greater as a supply DC voltage becomes smaller, resulting in requiring the large transformer in size. In addition, when the area of the EL element is reduced, the drive frequency of the EL element is increased if the inductance of the secondary winding is the same. However, since the drive frequency cannot be increased to a large extent with respect to the life and efficiency, the drive frequency is kept to be about 800 Hz by increasing the inductance of the secondary winding of the transformer. In this case where the EL element of 10 $cm^2$ is driven with 800 Hz, the inductance of, for example, 10 H or more is necessary. Therefore, the transformer cannot be reduced in size.

Next, the inverter proposed in the JP-B-Sho-62-11314 will be described below with reference to FIG. 1.

The inverter mainly includes a charging circuit 1010, a discharging circuit 1020 and a control circuit 1030. The charging circuit 1010 includes a boosting circuit composed of an inductor L1, a bipolar transistor Tr1 and an oscillating circuit 1011 for turning on/off the transistor TR1, and a diode D1 for rectifying the boosted current, and the discharging circuit 1020 is composed of a transistor Tr2.

Next, the operation of the inverter will be described below. When the control circuit 1030 supplies a charge control signal to the oscillating circuit 1011 as shown in FIG. 2A, the oscillating circuit 1011 oscillates in response to the charge control signal as shown in FIG. 2B and supplies the oscillation signal to the base of the transistor Tr1. When the oscillation signal is in the high level, the transistor Tr1 is turned on to flow current through the inductor L1. At this time, electromagnetic energy of $(½) \cdot L \cdot I^2$ is stored in the inductor L1, where L is inductance of the inductor L1 and I is a peak value of the current flowing through the inductor L1. Subsequently, when the oscillated signal goes to the low level, the transistor Tr1 is turned off such that the electromagnetic energy stored in the inductor L1 is transferred to the capacitive EL element through the diode D1 and stored therein. In this manner, by repeating the switching operation of the oscillation signal between the high level and low level, the EL element is charged step by step as shown in FIG. 2D. In this state, the charge control signal is changed to the low level, so that the oscillating circuit 1011 stops the oscillation. While the oscillation is stopped in the oscillating circuit 1011, the control circuit 1030 supplies a discharge control signal to the discharging circuit 1020 as shown in FIG. 2C. The transistor Tr2 of the discharging circuit 1020 is turned on to make the EL element to discharge the stored charge. A single period of operation in the inverter is completed as described above. The EL element lights twice, i.e., upon charging and discharging in the single period.

In the EL element lighting device using a low voltage power supply such as a dry battery as in JP-B-Sho-62-11314, since the oscillation frequency is required to be higher by 2 digits than the drive frequency of the EL element, the inductance of the inductor L1 must be about a few hundreds of μH. This value is smaller by 5 digits than that of the transformer in the above self-excited type of inverter including the blocking oscillating circuit. However, the EL element lighting device needs the control circuit in addition to the charging circuit and the discharging circuit. In addition, the control circuit needs to generate the two different, complicatedly controlled signals for controlling the charging circuit and the discharging circuit. As a result of this, the lighting device becomes complicated so that it cannot be down sized, resulting in the high cost of the lighting device.

In addition, in a case that a low voltage power supply such as a dry battery is used, the switching element for driving the inductor L1 is limited to a bipolar transistor having a low operation voltage. Since the bipolar transistor generally has a large turn off time of, for example, more than 1 μs, a part of current to be flowed into the EL element flows through the bipolar transistor during the transition of the bipolar transistor from the on state to the off state. As a result of this, the charging energy for the EL element is reduced such that the luminous efficiency is degraded, which makes it difficult to achieve high bright illumination of the EL element.

SUMMARY OF THE INVENTION

The present invention has, as an object, to provide a method and apparatus for lighting an EL element having a small size and a thin structure.

Another object of the present invention is to provide a method and apparatus for lighting an EL element having a high luminous efficiency.

Further another object of the present invention is to provide a method and apparatus for lighting an EL element capable of lighting an EL element with high brightness.

In order to achieve, an aspect of the present invention, an electroluminescence (EL) element lighting device for an EL element, includes a first circuit for self-oscillating to generate a first signal having a first frequency, and for gradually charging up said EL element in response to the first signal, and a second circuit for self-oscillating to generate a second signal having a second frequency, and for discharging the charge stored in said EL element in response to the second signal. The first frequency of the first signal is greater than the second frequency of the second signal, and the second signal is active only during a time interval less than 50% of each period of the second signal.

In order to achieve another aspect of the present invention, a method of lighting an electroluminescence (EL) element, includes the steps of:

self-oscillating first and second signals;

storing an energy during a part of each period of the first signal;

transferring the stored energy to said EL element during the other part of each period of the first signal; and discharging charge from said EL element in response to the second signal.

BRIEF DESCRIPTION OF THE DRAWINGS

FIG. 1 is a block diagram showing a conventional EL element lighting device including an inverter;

FIGS. 2A to 2D are timing charts for explaining the operation of the conventional EL element lighting device shown in FIG. 1;

FIG. 7 is a block diagram showing an EL element lighting device according to a second embodiment of the present invention;

FIGS. 8A to 8C are timing charts for explaining the operation of the EL element lighting device according to the second embodiment;

FIG. 10 is a block diagram showing an EL element lighting device according to a third embodiment of the present invention;

FIGS. 11A to 11C are timing charts for explaining the operation of the EL element lighting device according to the third embodiment.

DESCRIPTION OF THE PREFERRED EMBODIMENTS

The EL element lighting device according to the present invention will be described below in detail with reference to the accompanying drawings.

Figures 3, 4A, 4B, 4C, 4D:
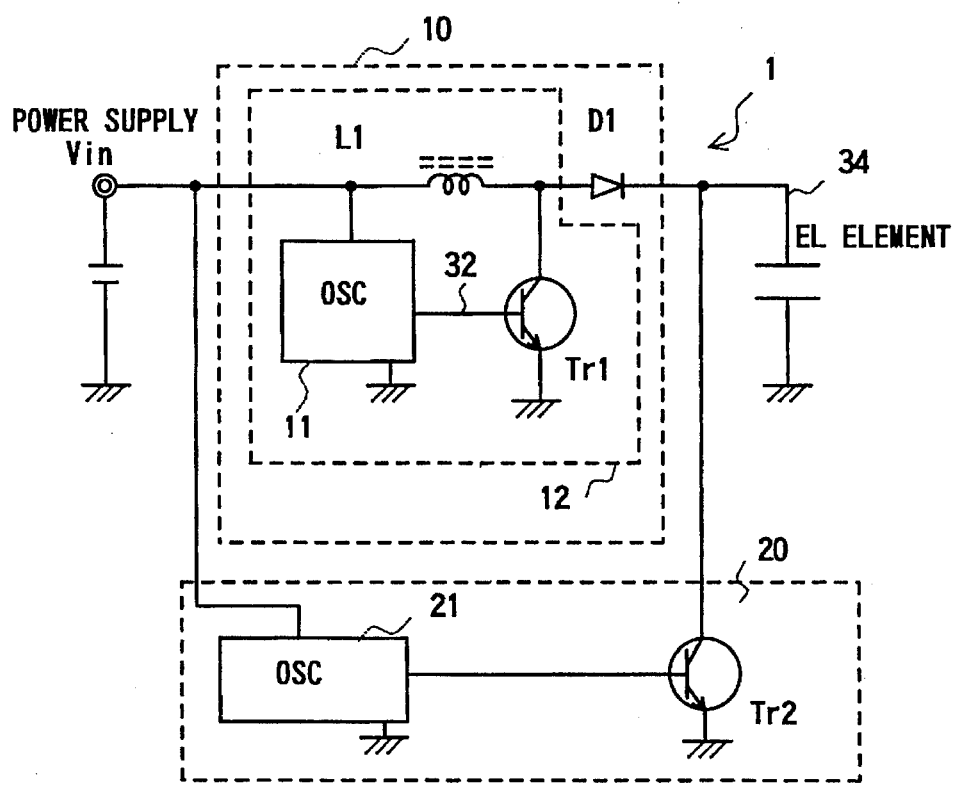
FIG. 3 is a block diagram showing an EL element lighting device according to a first embodiment of the present invention.
FIGS. 4A to 4D are timing charts for explaining the operation of the EL element lighting device according to the first embodiment.

First, the EL element lighting device according to the first embodiment of the present invention will be described below with reference to FIG. 3. Referring to FIG. 3, the EL element lighting device 1 is connected between a DC power supply Vin and a capacitive EL element. The EL element lighting device 1 mainly includes a charging circuit 10 and a discharging circuit 20. The charging circuit 10 includes a boosting circuit 12 composed of an inductor L1 having an inductance L as an inductive element and connected to the power supply at the terminal, a bipolar transistor Tr1 as a first switching element having a collector connected to the inductor L1 and an emitter connected to the ground and an oscillating circuit 11 for generating an oscillation signal to supply it to a base of the transistor Tr1 such that the transistor Tr1 is turned on/off, and a diode D1 connected to the inductor at the anode and to the EL element at the cathode, for rectifying the boosted current, and the discharging circuit 20 is composed of a transistor Tr2 as a second switching element having a collector connected to the EL element and an emitter connected to the ground and an oscillating circuit 21 for generating an oscillation signal to supply it to a base of the transistor Tr2.

Next, the operation of the EL element lighting device according to the first embodiment will be described below with reference to FIGS. 4A to 4D. The oscillating circuit 11 oscillates switching between a high level and a low level with a short period of time as shown in FIG. 4A, and supplies the oscillation signal to the base of the transistor Tr1. When the oscillation signal has the high level, the transistor Tr1 is turned on to flow current through the inductor L1 as shown in FIG. 4B. At this time, electromagnetic energy proportional to the square of current flowing through the inductor L1, $I^2$, is stored in the inductor L1. Subsequently, when the oscillated signal goes to the low level, the transistor Tr1 is turned off such that the electromagnetic energy stored in the inductor L1 is transferred to the capacitive EL element through the diode D1 and stored therein. In this manner, by repeating the switching operation of the oscillating circuit 11 between the high level and low level, the EL element is charged step by step as shown in FIG. 4D. When the charged voltage exceeds a threshold voltage of the EL element, the EL element lights. The oscillation frequency of the oscillating circuit 11 is in a range from a few tens of KHz to a few of MHz. That is, the frequency is higher by 1 to 3 digits than that of a drive signal of the EL element (to be described later) and therefore the inductance of the inductor L1 is only a few hundreds of μH, so that the lighting device can be achieved with a small inductor.

In the state that the EL element has been charged, the oscillating circuit 21 supplies to the base of the transistor Tr2 an oscillation signal as the drive signal having a predetermined duty ratio and switching between a high level and a low level, as shown in FIG. 4C. The frequency of the drive signal, i.e., the drive frequency is equal to the illumination frequency of the EL element and is usually about 800 Hz. In the discharging circuit 20, while the oscillation signal from the oscillating circuit 21 is in the low level, the transistor Tr2 is turned off so that the discharging operation is stopped. As a result, the EL element is charged up through the charging operation by the charging circuit 10 so that the voltage across terminals of the EL element rises. When the oscillation signal from the oscillating circuit 21 changes to the high level, the transistor Tr2 is turned on so that the charge stored in the EL element is discharged through the transistor Tr2 as shown in FIG. 4D. Therefore, the voltage across the terminal of the EL element drops. In this case, since the charging circuit 10 always operates, both of the charging circuit 10 and the discharging circuit 20 operate simultaneously. However, if the discharging transistor Tr2 has a great current capacity, almost all the stored charge in the EL element can be discharged. Therefore, the charging and discharging operation of the EL element can be performed reliably, and the luminous brightness is never degraded. In addition, since both of the charging circuit 10 and the discharging circuit 20 operate simultaneously, the power consumption in the charging circuit 10 during the discharge period is loss. However, the discharge time interval is set to be equal to or less than about 10% of the light period of the E1 element. In other words, the duty ratio of the oscillation signal from the oscillating circuit 21 is equal to or less than 10%. Therefore, the loss is very small and does not influence to the power consumption adversely.

As described above, in the present invention, the charging circuit is composed of an oscillating circuit, an inductor, a transistor and a diode and the discharging circuit is composed of an oscillating circuit and a transistor. Therefore, the conventional control circuit having a complicated structure is not required and the EL element lighting device having a small size and a thin structure can be provided with a low cost.

Figure 5:
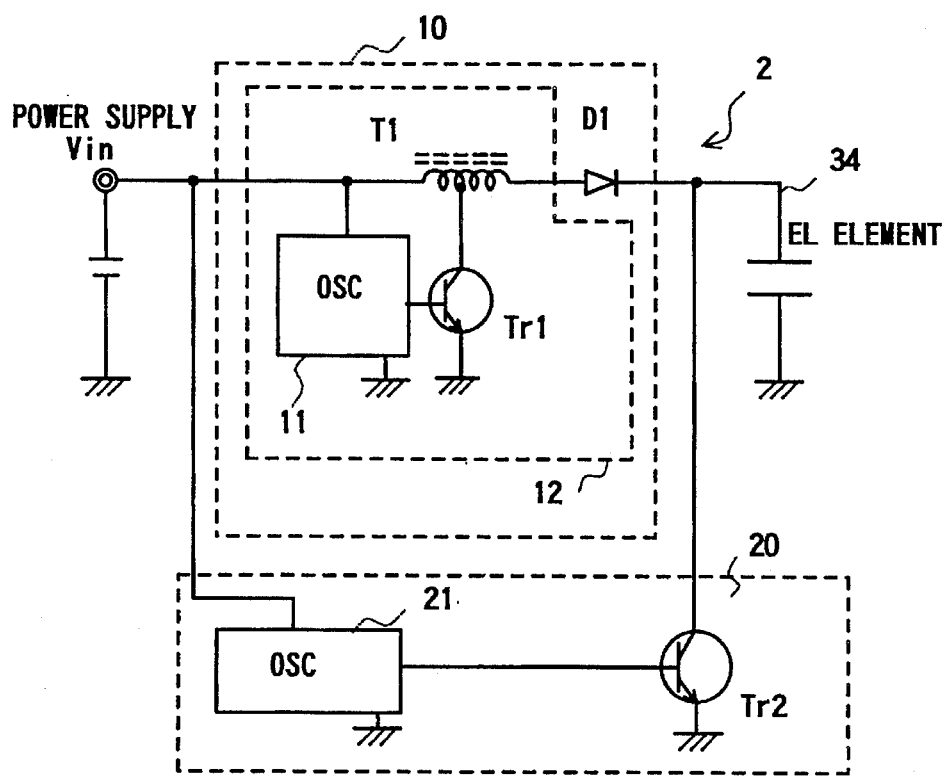
FIG. 5 is a block diagram showing a modification of the EL element lighting device according to the first embodiment of the present invention.

FIG. 5 is a block diagram showing a modification of the EL element lighting device according to the first embodiment, in which a transformer T1 is used in place of the inductor. With down sizing, the modification is less advantageous compared to the first embodiment using the inductor because the transformer is used. However, since the applied voltage to the EL element can be increased, it is made possible to light the EL element with high brightness. A terminal of the primary winding is connected to the DC power supply and a terminal of the secondary winding is connected to the diode D1. A central tap of the transformer T1 is connected to the collector of the transistor Tr1. The components is the same as in the first embodiment shown in FIG. 3. Therefore, the operation principle of the EL element lighting device using the transformer is substantially the same as that in the above first embodiment using the inductor. The output on the secondary winding side of the transformer T1 is boosted to a higher voltage by the secondary winding based on the energy stored by inductance on the primary side of the transformer T1. Thus, the inductance on the primary winding side of the transformer T1 may be approximately equal to the inductance of the inductor L1 as much as a few hundreds of μH, and the inductance on the secondary winding side of the transformer T1 is a few of mH at maximum. Therefore, the transformer can be realized with an inductance smaller by about four digits than that used in the self-excited type of inverter.

The transformer T1 shown in FIG. 5 is a transformer in which the primary winding is electrically connected to the secondary winding. However, a transformer such as a usual one in which the primary winding is electrically insulated from the secondary winding may be used.

Figure 6:
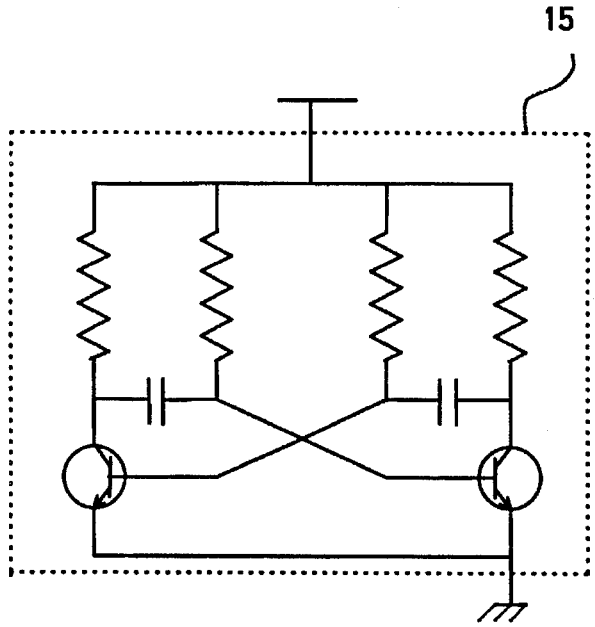
FIG. 6 is a block diagram showing a multivibrator which can be used in the EL element lighting device according to the first embodiment.
Figure 9:
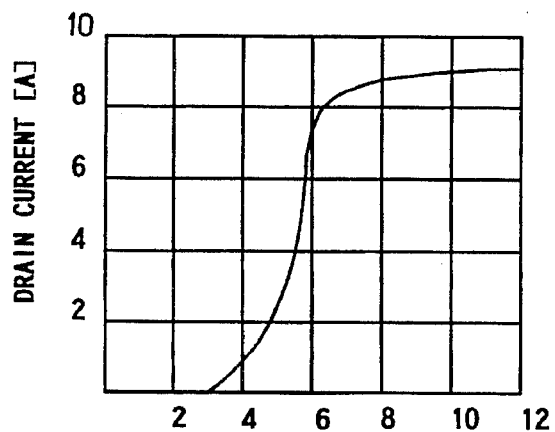
FIG. 9 is a graph showing the drain current—gate voltage characteristic of an FET used in the EL element lighting device according to the second embodiment.

In the EL element lighting device shown in FIG. 3 or 5, a multivibrator shown in FIG. 6 may be used as the oscillating circuit. As a result, the structure of the oscillating circuit is simple, and may be manufactured as an IC, resulting in down sizing of the lighting device.

Next, the EL element lighting device using a low voltage DC power supply such as dry battery according to the second embodiment of the present invention will be described below with Reference to FIG. 7. Referring to FIG. 7, the EL element lighting device includes a charging circuit 110, a discharging circuit 120, and a control circuit 130. The charging circuit 110 includes a boosting circuit 112 and a diode D1 connected to the power supply Vin at the anode and to the E1 element at the cathode. The boosting circuit 112 is composed of an oscillating circuit 111 connected between the power supply Vin and the ground to generate an oscillation signal, a FET driving circuit 113, an inductor connected between the power supply Vin and the diode D1, a FET having a drain connected to the connection node between the inductor L1 and the diode D1 and a source connected to the ground. The FET driving circuit 113 includes an inductor L2 connected to the power supply Vin, a diode D2 connected to the inductor L2 at the anode, a transistor Tr3 having a collector connected to the cathode of the diode D2, a base connected to the oscillating circuit 111 to receive the oscillation signal, and the emitter connected to the ground, and a capacitor C1 connected between the collector of the transistor Tr3 and the ground. The gate of the FET is connected to the collector of the transistor Tr3. The capacitor C1 connected to the gate of the FET is for stabling the gate voltage of the FET. Therefore, if the gate capacitance is great, the capacitor C1 may be omitted. The discharging circuit 120 includes a transistor Tr2 having the collector connected to the EL element, a base connected to the control circuit 130, and the emitter connected to the ground. The control circuit 130 generates a charge control signal and a discharge control signal.

Next, the operation principle of the EL element lighting device according to the second embodiment will be described below with reference to FIGS. 8A to 8C. The operation principle of the lighting device is substantially the same as that in the first embodiment. The oscillating circuit 111 oscillates in response to a charge control signal from the control circuit 130 to generate the oscillation signal. FIG. 8A shows the waveform of the output signal of the oscillating circuit 111 in the charging circuit 110. The output signal has the waveform in which the high level and low level alternatively appear with a predetermined period. The transistor Tr3 is turned on or off based on the oscillation signal of the high level. When the oscillation signal is in the high level so that the transistor Tr3 is turned on, the current flows from the DC power supply Vin into the inductor L2 as shown in FIG. 8B. At this time, the energy proportional to the square of the current is stored in the inductor L2. When the oscillation signal is changed to the low state so that the transistor Tr3 is turned off, the energy is emitted and stored in the gate capacitor of the FET and the capacitor C1 through the diode D2. In this manner, the gate of the FET is supplied with a voltage higher than a threshold voltage as shown in FIG. 8C and the FET is turned on. At this time, the energy is stored in the inductor L1. When the oscillation signal goes to the high level again, the inductor L2 charging operation is performed. At the same time, the charge stored in the capacitor C1 is discharged through the transistor Tr3, so that the FET is turned off. As a result, the energy stored in the inductor L1 during the ON sate of the FET is stored in the EL element through the diode D1 during the OFF state of the FET. This charging operation is repeated until the EL element is gradually or step by step charged up to a predetermined voltage. After the EL element is charged to the predetermined voltage, the transistor Tr2 in the discharging circuit 120 operates in response to a discharge control signal from the control circuit 130 to discharge the charge stored in the EL element such that the EL element is lighted on.

When the EL element lighting device is used to light the EL element of, for example, 10 cm$^2$ with dry battery of 1.5 V, the brightness of 3 cd/m$^2$ is obtained only with 60 mW in the conventional EL element lighting device using a bipolar transistor. On the other hand, in the EL element lighting device according to the present invention, the brightness of 8 cd/m$^2$ can be obtained with the same condition and it is 2.5 times compared to the value in the convention device.

In a case where the supply voltage of the power supply is a few volts higher than the threshold voltage of the FET, the FET can be used even if the FET drive circuit 113 is not provided. However, since the greater drain current can be obtained, i.e., the on resistance is smaller when the gate voltage is higher in the region of gate voltage greater than the threshold voltage of the FET (2.5 V) as shown in FIG.

9, the high luminous efficiency can be obtained if the EL element lighting device according to the present invention.

Further, the oscillating circuits 111 and 221 may be constituted of a multivibrator which includes two transistors, two capacitors and four resistors, as shown in FIG. 6. In this case, an IC of high cost is not necessary and can be further down sized.

According to the present embodiment, since the EL element lighting device includes the control circuit, it has less advantage than the first embodiment with respect to the small sizing and thin structure. However, the luminous efficiency is higher than that in the first embodiment and has the higher practicability. Further, a transformer may be used in place of the inductor L1 of FIG. 7 as in the modification of the first embodiment. In this case, a higher voltage can be applied to the EL element so that the illumination of the EL element with a higher brightness can be achieved.

Next, the EL element lighting device 200 according to the third embodiment will be described below in which the control circuit 130 is omitted from the second embodiment so that the down sizing, thin structure and high luminous efficiency of the EL element lighting device can be achieved with low cost. Referring to FIG. 10, the EL element lighting device 200 uses the FET and the FET driving circuit 213 as in the above second embodiment but the control circuit is omitted. That is, the charging circuit always operates and the discharging transistor Tr2 is turned on with a predetermined period with a predetermined duty ratio. As a result, the charge stored in the EL element is discharged intermittently, as in the first embodiment shown in FIG. 3. In this manner, the EL element is applied with the voltage in the same manner as in the first embodiment and it is lighted.

Figure 12:
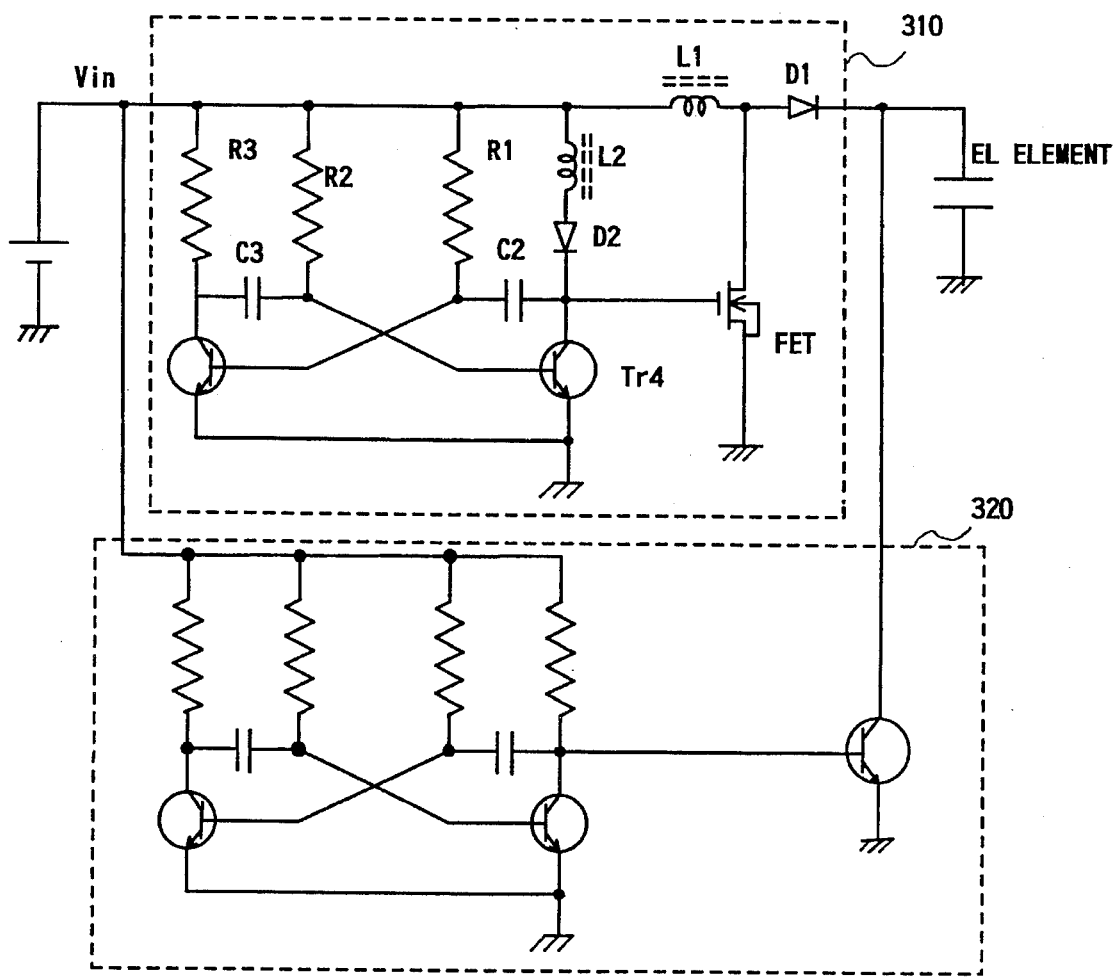
FIG. 12 is a block diagram showing the EL element lighting device according to a fourth embodiment of the present invention.

Next, the EL element lighting device according to the fourth embodiment will be described below with reference to FIG. 12. In this embodiment, a multivibrator is used as the oscillating circuit and FET driving circuit as a unit. That is, the transistor Tr3 of the FET driving circuit is used as one driving transistor Tr4 of the multivibrator. Also, the inductor L2 and the diode D2 are used as a load of the driving transistor Tr4 and a capacitor C2 connected to the collector of the transistor Tr3 for a time constant is used as the capacitor C1 in the FET driving circuit. As a result, the collector voltage of the driving transistor Tr3 rises due to voltage of the capacitor C2 to a voltage sufficient to turn on the FET when the transistor Tr3 is turned off even if the low voltage power supply such as dry battery is used. For this reason, the FET can be used in the EL element lighting device using the low voltage power supply. The parts to be added are only the inductor L2, diode D2 and FET, compared to the first embodiment.

As described above, according to the EL element lighting device of the present invention, an inductor or transformer used as the inductive element is smaller by 4 to 5 digits than that of the conventional EL element lighting device. In addition, a complicated control circuit is not necessary. Further, the switching element such as a transistor is controlled by the oscillating circuit. Therefore, the EL element lighting device is of a small size, thin type and of low cost. The oscillating circuits always operate because the control circuit is omitted. In this case, since the discharging circuit is operated only during a small time interval of each period, for example, a time interval less than 50% of the period, desirably a time interval less than 10% of the period, the loss of the power consumption can be reduced in minimum.

Further, since a FET having a faster switching speed can be used even in a case that a low voltage power supply such as dry battery is used as the DC power supply, the EL element can be lighted with high brightness. In this case, if a multivibrator composed of parts such as the transistors and resistors is used to drive the FET and one of the transistors is used commonly to the multivibrator and the FET driving circuit, the number of parts in the EL element lighting circuit can be reduced to a minimum and the high brightness illumination can be achieved. From these features, the EL element lighting device according to the present invention is suitable for back-lighting in the liquid crystal display of a small type electronic apparatus.

What is claimed is:

1. An electroluminescence (EL) element lighting device for an EL element, comprising:

a first circuit for self-oscillating to generate a first signal having a first frequency, and for gradually charging up said EL element in response to the first signal; and a second circuit for self-oscillating to generate a second signal having a second frequency, and for discharging the charge stored in said EL element in response to the second signal, and wherein the first frequency of the first signal is greater than the second frequency of the second signal, and the second signal is active only during a time interval less than 50% of each period of the second signal.

2. The EL element lighting device according to claim 1, said first circuit includes an inductive element and stores energy in said inductive element and transfers the stored energy to said EL element.

3. The EL element lighting device according to claim 2, wherein said inductive element is either an inductor or a transformer.

4. The EL element lighting device according to claim 1, wherein said predetermined part of each period of the second signal is less than 10% of the each period.

5. The EL element lighting device according to claim 1, wherein said first circuit includes:

an inductive element coupled to a DC power supply;

a rectifying element connected to said inductive element at the anode and connected to said EL element at the cathode;

a switching element coupled to a node between said inductive element and said rectifying element and the ground, for switching in response to the first signal; and a driving circuit for generating the first signal to drive said switching element such that an energy is stored in said inductive element during an on state of said switching element and is transferred to said EL element during an off state of said switching element.

6. The EL element lighting device according to claim 1, wherein said first circuit includes:

an inductive element coupled to a DC power supply;

a rectifying element connected to said inductive element at the anode and connected to said EL element at the cathode;

a switching element coupled to a node between said inductive element and said rectifying element and the ground, for switching in response to the first signal;

a self-oscillating circuit for generating the first signal; and a driving circuit for driving said switching element in response to the first signal, such that an energy is stored in said inductive element during an on state of said switching element and is transferred to said EL element during an off state of said switching element.

7. The EL element lighting device according to claim 1, wherein said first circuit stores energy during a part of each period of the first signal and transfers the stored energy to said EL element during the other part of each period of the first signal.

8. The EL element lighting device according to claim 7, wherein said first circuit includes:
   an inductive element coupled to a DC power supply;
   a rectifying element connected to said inductive element at the anode and connected to said EL element at the cathode;
   a switching element coupled to a node between said inductive element and said rectifying element to the ground, for switching in response to a driving signal;
   an oscillating circuit for self-oscillating to generate the first signal; and
   a driving circuit responsive to the first signal, for generating and supplying the driving signal to said switching element, such that an energy is stored in said inductive element during the part of each period of the first signal and is transferred to said EL element during the other part of each period of the first signal.

9. The EL element lighting device according to claim 5, wherein said first circuit includes:
   an inductive element coupled to a DC power supply;
   a rectifying element connected to said inductive element at the anode and connected to said EL element at the cathode;
   a switching element coupled to a node between said inductive element and said rectifying element and to the ground, for switching between an on state and an off state; and
   driving means for driving said switching element while self-oscillating to generate the first signal, such that an energy is stored in said inductive element during the part of each period of the first signal and is transferred to said EL element during the other part of each period of the first signal.

10. The EL element lighting device according to claim 1, wherein said first circuit is connected to a DC power supply having a supply voltage lower than a threshold voltage of a FET, and includes:
    an inductive element coupled to the DC power supply;
    a rectifying element connected to said inductive element at the anode and connected to said EL element at the cathode;
    a FET having a drain coupled to a node between said inductive element and said rectifying element and a source connected to the ground, for switching between an on state and an off state; and
    boosting means for self-oscillating to generate the first signal, for boosting the supply voltage to a voltage higher than the threshold voltage of said FET in response to the first signal such that an energy is stored in said inductive element during an on state of said FET and is transferred to said EL element during an off state of said FET.

11. The EL element lighting device according to claim 5, wherein said driving circuit includes an additional inductive element, for driving said switching element by an energy stored in said additional inductive element.

12. The EL element lighting device according to claim 5, wherein said driving circuit includes:
    a multivibrator including two transistors and an additional inductive element coupled to a collector of one of the two transistors, for driving said switching element while generating the first signal such that said switching element is turned on by an energy stored in said additional inductive element when said one transistor is turned off.

13. An electroluminescence (EL) element lighting device for an EL element, comprising:
    a first circuit responsive to a first control signal, for generating a first signal having a first frequency, and for gradually charging up said EL element in response to the first signal;
    a second circuit responsive to a second control signal, for generating a second signal having a second frequency, and for discharging the charge stored in said EL element in response to the second signal, the first frequency of the first signal being greater than the second frequency of the second signal;
    a control circuit generating and supplying the first and second control signals to said first and second circuits, respectively, and
    wherein said first circuit includes:
       a signal generating circuit for generating the first signal in response to the first control signal;
       an inductive element coupled to a DC power supply at a terminal; and
       a FET coupled to said inductive element at the other terminal thereof and to the ground, and responsive to the first signal, for performing a switching operation in response to a drive signal; and
       a driving circuit for driving said FET in response to the first signal such that an energy stored in said inductive element during the on state of said FET is transferred to said EL element during the off state of said FET.

14. The EL element lighting device according to claim 13, wherein said inductive element is either an inductor or a transformer.

15. A method of lighting an electroluminescence (EL) element, comprising the steps of:
    self-oscillating first and second signals;
    storing an energy during a part of each period of the first signal;
    transferring the stored energy to said EL element during the other part of each period of the first signal; and
    discharging charge from said EL element in response to the second signal.

\* \* \* \* \*